(No Model.)

G. ANDREWS.
BELTING.

No. 246,443.                                   Patented Aug. 30, 1881.

WITNESSES:
C. Neveux
C. Sedgwick

INVENTOR:
G. Andrews
BY Munn & Co.
ATTORNEYS.

UNITED STATES PATENT OFFICE.

GEORGE ANDREWS, OF BELLOWS FALLS, VERMONT.

BELTING.

SPECIFICATION forming part of Letters Patent No. 246,443, dated August 30, 1881.

Application filed May 13, 1881. (No model.)

*To all whom it may concern:*

Be it known that I, GEORGE ANDREWS, of Bellows Falls, in the county of Windham and State of Vermont, have invented a new and useful Improvement in Belts for Machinery, of which the following is a specification.

The object of my invention is the production of an improved and durable belt to be used on all machines that employ narrow or round belts; and the invention consists of a belt formed of a core of some strong material, preferably catgut, wound with strong wire.

Figure 1:
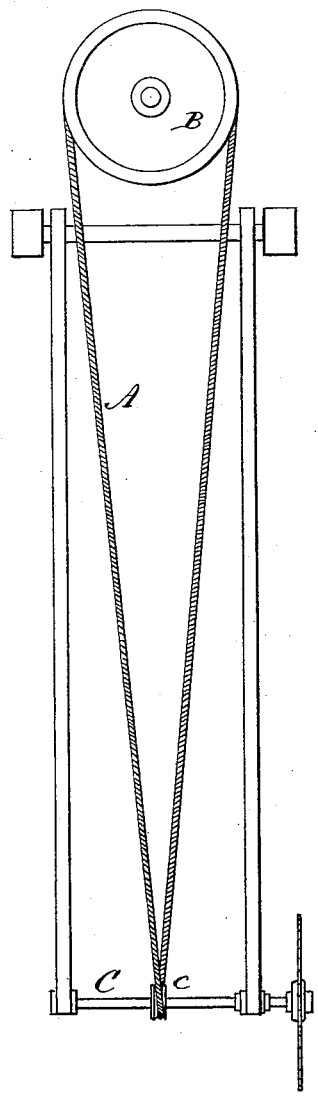
Figure 2:
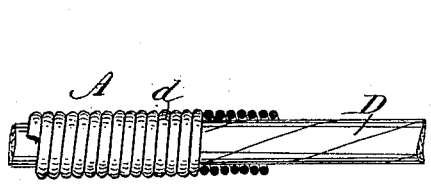

In the accompanying drawings, Figure 1 shows my improved belt applied for use; and Fig. 2 is a view of a small portion of the belt with some of the wire cut and removed.

Similar letters of reference indicate corresponding parts.

A represents the belt which passes over the drive-pulley B and the small pulley $c$ for driving the shaft C. This belt is round in cross-section and presents a metallic wearing-surface to the pulleys. The core D of the belt is preferably of catgut, and it is closely wound with the wire $d$, which is preferably of some non-tempered or non-elastic metal, such as brass or copper or soft iron. Thus formed, the metal surface of the belt renders the belt very durable, and it presents a beautiful appearance, and the belt is very strong and not liable to become stretched and loose.

I am aware that a wire has been coiled so as to form a spiral spring around a gutta-percha core, so as to make all portions of a belt stretch equally; but my object is to prevent stretching nearly or quite altogether.

What I claim as new is—

A belt formed of soft-metal wire wrapped with its convolutions in close contact about a rigid non-elastic core, as described.

GEORGE ANDREWS.

Witnesses:
  H. KING, Jr.,
  H. L. SMITH.